(12) United States Patent
Davis et al.

(10) Patent No.: US 9,652,273 B2
(45) Date of Patent: May 16, 2017

(54) METHOD AND SYSTEM FOR CREATING A HIERARCHY OF VIRTUAL MACHINE TEMPLATES IN A VIRTUALIZED COMPUTING SYSTEM

(71) Applicant: VMware, Inc., Palo Alto, CA (US)

(72) Inventors: Scott Howard Davis, Needham, MA (US); Aaron Sweemer, Cincinnati, OH (US); Clint Greenwood, Florence, KY (US); Benjamin J. Corrie, San Francisco, CA (US); George Hicken, San Francisco, CA (US); Zhenhua Yang, Santa Clara, CA (US)

(73) Assignee: VMware, Inc., Palo Alto, CA (US)

( * ) Notice: Subject to any disclaimer, the term of this patent is extended or adjusted under 35 U.S.C. 154(b) by 66 days.

(21) Appl. No.: 14/505,349

(22) Filed: Oct. 2, 2014

(65) Prior Publication Data

US 2016/0098285 A1   Apr. 7, 2016

(51) Int. Cl.
  G06F 9/455   (2006.01)
  G06F 9/46    (2006.01)
  G06F 21/00   (2013.01)
  G06F 13/00   (2006.01)

(52) U.S. Cl.
  CPC ...... *G06F 9/45545* (2013.01); *G06F 9/45558* (2013.01); *G06F 2009/45562* (2013.01); *G06F 2009/45583* (2013.01)

(58) Field of Classification Search
  None
  See application file for complete search history.

(56) References Cited

U.S. PATENT DOCUMENTS

| | | | |
|---|---|---|---|
| 2007/0074208 A1* | 3/2007 | Ling | G06F 9/45558 718/1 |
| 2013/0326507 A1* | 12/2013 | McGrath | G06F 9/4856 718/1 |
| 2014/0196028 A1 | 7/2014 | Macpherson et al. | |

OTHER PUBLICATIONS

International Search Report and Written Opinion PCT/US2015/053339, dated Dec. 18, 2015 consists of 13 pages.
Wolf, "VMware and Docket—Better Together", Sep. 17, 2014, Xp055235232, Retreved from the Internet:URL: web.archive.org/web20140917025114/http://blogs.vmware.com/cto/vmware-docker-better (retrieved on Dec. 10, 2015).

(Continued)

*Primary Examiner* — Bing Zhao (57) ABSTRACT

A virtualized computing system supports the execution of a plurality of virtual machines, where each virtual machine supports the execution of applications therein. Each application executes within a container that isolates the application executing therein from other processes executing on the computing system. A hierarchy of virtual machine templates is created by instantiating a parent virtual machine template, the parent virtual machine template having a guest operating system and a container. An application to be run in a container is determined, and, in response, the parent virtual machine template is forked to create a child virtual machine template, where the child virtual machine template includes a replica of the container, and where the guest operating system of the parent virtual machine template overlaps in memory with a guest operating system of the child virtual machine template. The application is then installed in the replica of the container.

18 Claims, 5 Drawing Sheets

(56) References Cited

OTHER PUBLICATIONS

Colbert., "vmware+Containers=Containers without Compromise", Sep. 17, 2014, XP055235229, Retrieved from the Internet:URL web.archive,org//web/20140917021237/ http://blogs,.vmware-containers-containers without compromise [retrived on Dec. 10, 2015].

Merkel, "Docker: Lightweight LInux Containers for Consistent Developement and Deployment", Linux Journal, vol. 2014 Issue 239, Mar. 2014, Mar. 1, 2014, Xp055171140, Retrieved from the Internet: URL linuxjournal.com/content/docker-lightweight-linux-containers-consistent-developement-amd-deployment [retrieved on Feb. 20, 2105].

Dua et al., "Virtualization vs Containerization to Support PaaS", 2014 IEEE International Confrence on Cloud Engineering, IEEE, Mar. 11, 2014 pp. 610-614, XP032647689, D0I:10.1109/IC2E.201.41 [retrieved on Sep. 18, 2014].

\* cited by examiner

METHOD AND SYSTEM FOR CREATING A HIERARCHY OF VIRTUAL MACHINE TEMPLATES IN A VIRTUALIZED COMPUTING SYSTEM

BACKGROUND

Recently, the use of application containers has become prevalent as a way of executing applications on a host computer. A container provides for the isolation of a group of processes from the others on an operating system. By making use of existing operating system functionality (such as Linux name spaces), containers maintain their own private view of the operating system, file system structure, and network interfaces. Containers share the operating system kernel with other processes, but can be constrained to some extent to use an amount of resources such as the central processing unit (CPU), random access memory (RAM), or input/output (I/O) devices. Containers have proven advantageous because they typically have a small system "footprint." That is, containers provide a relatively thin encapsulation layer above and beyond any applications contained therein. Thus, instantiation and deployment of containers is relatively quick.

Virtual machines, on the other hand, tend to deploy more slowly than containers. This is due to the fact that virtual machines are a software abstraction of a physical computer. Thus, a virtual machine typically includes a guest operating system and a virtual hardware platform. These virtualized system components are not present in containers.

However, virtual machines are advantageous because a higher degree of isolation and security may be achieved between virtual machines as opposed to the degree of isolation that may be achieved between containers. This is due to the filet that containers run on the same kernel; thus problems from one container may "infect" other containers. In addition, while containers may be configured to use a certain amount of system resources, it is possible for a malicious application executing in a container to circumvent such restrictions and monopolize CPU, storage, or I/O resources. By contrast, virtual machines allow system administrators to separately configure each virtual machine in a cloud environment to receive a predefined allocation of system resources. For example, in some cases, a virtual machine may be configured to receive a guaranteed minimum allocation of CPU resources. In other cases, a virtual machine may be configured to receive a constant relative share of available CPU resources. This isolation and security provided by virtual machines is especially important in multi-tenant cloud-based computing environments.

Further, because the application programming interface (API) that a hypervisor uses to execute a virtual machine is more limited than the API of a general purpose kernel operating system, virtual machines tend to have a smaller attack surface than a shared kernel. Thus, it is generally more difficult to compromise a virtual machine executing under control of a hypervisor than it is to compromise a container running under the control of a shared kernel. Further, even if a virtual machine is compromised, superior isolation of virtual machines prevents the compromised virtual machine from affecting other virtual machines. Finally, there exists a rich set of management tools directed to virtual machine environments that is lacking in containerized environments.

Therefore, cloud-based computing environments are often faced with a choice between rapidly deployable, but weakly isolated and unsecure, containers, and strongly isolated and highly secure, but slowly deployed, virtual machines.

SUMMARY

In a first embodiment, a method of creating a hierarchy of virtual machine templates in a virtualized computing system is provided, the virtualized computing system supporting the execution of a plurality of virtual machines, and each virtual machine supporting the execution of one or more applications therein. Each application executes within a container that isolates the application executing therein from other processes executing on the virtualized computing system. The method comprises the steps of instantiating a first parent virtual machine template having a guest operating system and a first container, and determining a first application to be run in a container. The method further comprises the steps of forking the first parent virtual machine template to create a first child virtual machine template, the child template virtual machine including a replica of the first container, wherein the guest operating system of the first parent virtual machine template is mapped to a memory location that overlaps with a memory location of a guest operating system of the first child virtual machine template. The method further comprises the step of installing the first application in the replica of the first container.

A second embodiment provides a non-transitory computer-readable medium that includes instructions that, when executed, enable a host computer to implement one or more aspects of the above method.

In a third embodiment, a method of deploying containerized applications for execution within virtual machines is provided, the virtual machines executing in a virtualized computing system, each virtual machine supporting the execution of one or more containerized applications therein, and each application executing within a container that isolates the application executing therein from other processes executing on the virtualized computing system. The method comprises the steps of receiving from a requestor a request to execute an application and locating a first virtual machine template that includes a container configured to execute the application. The method further includes the steps of forking the first virtual machine template to create a first child virtual machine that includes a replica of the container, and launching the application to execute within the first child virtual machine.

DETAILED DESCRIPTION

Figure 1:
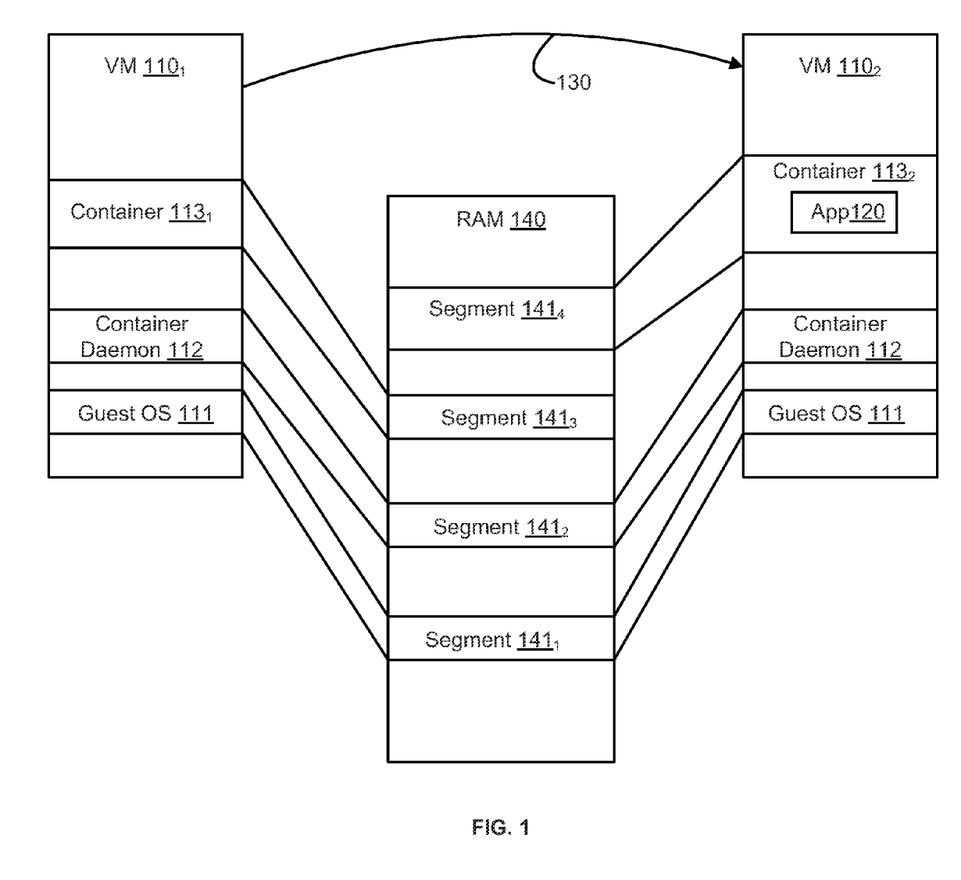
FIG. 1 is a conceptual diagram that depicts a process of forking a parent virtual machine (VM) in order to create a child VM, according to embodiments.

FIG. 1 is a conceptual diagram that depicts a process of forking a parent VM order to create a child VM, according to embodiments. VM $110_1$ is a parent VM, while VM $110_2$ is the child VM created from VM $110_1$. The fork operation is depicted, conceptually, by arrow 130. Each VM (both parent and child) executes guest operating systems (OS'), a container daemon, and one or more containers. Further, each VM executes under control of a hypervisor in a host computer (not shown).

As shown in FIG. 1, VM $110_1$ executes a guest operating system (OS) 111. Guest OS 111 is an operating system capable of being executed in a virtualized computing environment, and which supports application containers (described in more detail below). Examples of guest OS 111 include, for example, versions of the Linux® operating system.

When guest OS 111 executes within VM $110_1$, portions of the operating system code and associated data are allocated memory pages in system random access memory, or RAM (depicted as RAM 140 in FIG. 1). Conceptually, the allocation of RAM to guest OS 111 may be depicted as a segment of RAM. Thus, guest OS 111 is depicted as being allocated segment $141_1$ in FIG. 1, should be noted that the allocation of physical memory for guest OS 111 is not necessarily a contiguous range of physical memory addresses. Rather, the depiction of segment $141_1$ as a contiguous block of memory is for illustrative purposes. In embodiments, instructions and data for guest OS 111 are loaded into RAM 140 (typically through execution of a hypervisor (not shown) configured to manage the execution of virtual machines), where the instructions and data are fetched from segment $141_1$ to be executed on a central processing unit (CPU) when VM $110_1$ is allocated processing time on the CPU.

VM $110_1$ also executes container daemon 112. Container daemon 112 (which runs as a virtualized application under the control of guest OS 111) is a process that enables the creation, deletion, and management of container objects (or "containers") for VM $110_1$. Containers are software instances that enable virtualization at the operating system level. That is, with containerization, the kernel of an operating system that manages a host computer is configured to provide multiple isolated user space instances. These instances, referred to as containers, appear as unique servers from the standpoint of an end user that communicates with the containers. However, from the standpoint of the operating system that manages the host computer on which the containers execute, the containers are user processes that are scheduled and dispatched by the operating system.

According to one or more embodiments, container daemon 112 communicates with local (or remote) processes according to a client/server model. For example, a client process (e.g., a system administration process) may transmit a request to container daemon 112 to instantiate a new container or to install a new application in an already existing container. Further, another client process may transmit a request to container daemon 112 to quiesce or destroy a container.

As was the case for guest OS 111, program instructions that correspond to container daemon 112 are loaded, after translation of virtual addresses to physical addresses, into RAM 140 and subsequently executed from RAM 140. As shown in FIG. 1, container daemon 112 is allocated segment $141_2$ in RAM 140. Segment $141_2$ is depicted as a contiguous block of physical RAM. However, the depiction is for illustrative purposes. That is, instructions and data corresponding to container daemon 112 may be loaded into non-contiguous portions of RAM 140.

It should be noted that container daemon executes as a part of VM $110_1$, and runs, in a virtualized manner, under the control of guest OS 111. Thus, container daemon 112 executes system calls and requests operating system services and VM resources from guest OS 111. Guest OS 111 allocates virtual resources to container daemon 112, which correspond to physical computing resources (such as physical memory in RAM 140). The physical resources are allocated by a hypervisor that manages the execution of VM $110_1$, as well as all other virtual machines executing within the particular host computer on which VM $110_1$ runs.

Referring to FIG. 1, VM $110_1$ also includes a container that executes therein, depicted as container $113_1$. Container $113_1$ is instantiated on VM $110_1$ by container daemon 112. An instantiated container executes in a state where an application may be installed therein. Container $113_1$ also executes under the control of guest OS 111. As shown, instructions and data corresponding to container $113_1$ (which executes in a virtual address space) are loaded into segment $141_3$ of physical RAM 140.

As previously mentioned, fork operation 130 creates a child VM (i.e., VM $110_2$) based on parent VM $110_1$. In embodiments, a system administrator initiates fork operation 130 using a system management software platform. In other embodiments, fork operation 130 is initiated automatically by system management software upon detection of a condition on the host computer on which the VMs execute. In addition, the parent VM may itself initiate fork operation 130. The forking of a VM is similar in spirit to the forking of a process, such as performed by the fork( ) system call in the Unix operating system. When a parent VM issues a fork call, one or more clones of the parent VM (referred to as child VMs) are created. Each child VM replicates all of the running processes and threads executing in the parent VM and executes on the same host computer that the parent VM executes on. When a child VM is created, the child VM has an identical view of the host computer on which the parent VM is running. Indeed, once a child VM is created as a result of a fork operation executed by a parent VM, the child VM starts executing at the instruction that immediately follows the fork operation executed in the parent. Each child VM has a different (and unique) identifier, which allows each to be distinguished from the other child VMs and from the parent. Each child VM executes independent of the parent VM and from other child VMs.

At the time a child VM is created, the memory image of the child VM (i.e., the instructions and data stored in RAM 140) maps to the same memory locations in RAM 140 as the memory image of the parent VM. Indeed, the VM fork operation results in the creation of a stateful clone of the parent VM, meaning that, at the time of the VM fork operation, the current state of the child VM (including the memory state of the child VM) is the same as that of the parent VM. However, as a child VM begins to execute and attempt to modify the memory pages that are shared with the parent VM, those memory pages are first copied to a different region of memory (e.g., RAM 140), the child VM's virtual memory is then altered to map to the copied pages, and the copied pages are then modified by the child VM. Such a scheme is referred to as "copy-on-write" (COW).

Embodiments of the present invention implement a COW scheme, such that the memory state of the parent VM is not disturbed by memory writes issued by corresponding child VMs.

Thus, as shown in FIG. 1, when VM $110_2$ is created by forking operation 130, the guest OS executing in VM $110_2$ (denoted also by guest OS 111) maps to segment $141_1$ of RAM 140, which is the same segment of RAM 140 that guest OS 111 of VM $110_1$ maps to. Similarly, container daemon 112 executing in VM $110_2$ maps to segment $141_2$ of RAM 140, which is the same segment of RAM 140 that container daemon 112 that is executing in VM $110_1$ maps to.

At the time that VM $110_2$ is created by forking process 130, VM $110_2$ includes container $113_2$, which maps to the same physical memory location (i.e., segment $141_3$) as does container $113_1$ executing in VM $110_1$. It should be noted that container $113_1$ is an "empty" container, which does not have any applications installed therein. However, once an application is installed in a container (e.g., by a system administrator), the memory image of the container changes (i.e., the container grows in size and the data stored therein changes) because additional application instructions and data are stored with the container. Thus, as shown in FIG. 1, application 120 is depicted as having been installed into container $113_2$ of VM $110_2$. Due to the COW semantics reined to above, once application 120 is installed in container $113_2$, container $113_2$ no longer maps to segment $141_3$. This is due to the fact that, when application 120 is installed, segment $141_3$ is insufficient to support the increased memory required to execute application 120 within container $113_2$. Further, because application installation changes the memory to which container $113_2$ is mapped, COW requires container $113_2$ to be mapped to a different memory segment. Thus, in order to accommodate the increased memory needs of application container $113_2$, guest OS 111 allocates additional virtual memory for application container $113_2$, which is mapped (by a hypervisor that manages physical RAM for VM $110_2$) to segment $141_4$ of RAM 140. Although segment $141_4$ is depicted as being completely separate from segment $141_3$, it should be noted that the two segments may in fact partially overlap. That is, some instructions and data pertaining to container $113_1$ may also remain unchanged as a result of the execution of application container $113_2$. Thus, the portion of RAM 140 that corresponds to these instructions and data may be shared by VMs $110_1$ and $110_2$. In such a case, only the additional instructions and data for application 120 (and any container data that application 120 changes as a result of executing) would be located in a portion of RAM 140 that does not overlap with segment $141_3$.

Containerized applications that run within virtual machines provide a number of benefits. Application containers have the benefit of being lightweight and having low startup times. In addition, application containers are able to execute under the direct control of a native operating system or a guest operating system of a virtual machine. However, application containers do not provide the same level of isolation as do virtual machines, which is important in multi-tenant cloud-based computing environments. Further, containers are difficult, if not impossible, to manage using existing virtual machine management and monitoring tools. On the other hand, virtual machines (which each include a guest operating system executing therein) tend to have larger memory footprints and higher startup times. Thus, containerized applications executing within virtual machines that have low startup times are advantageous.

Figure 2:
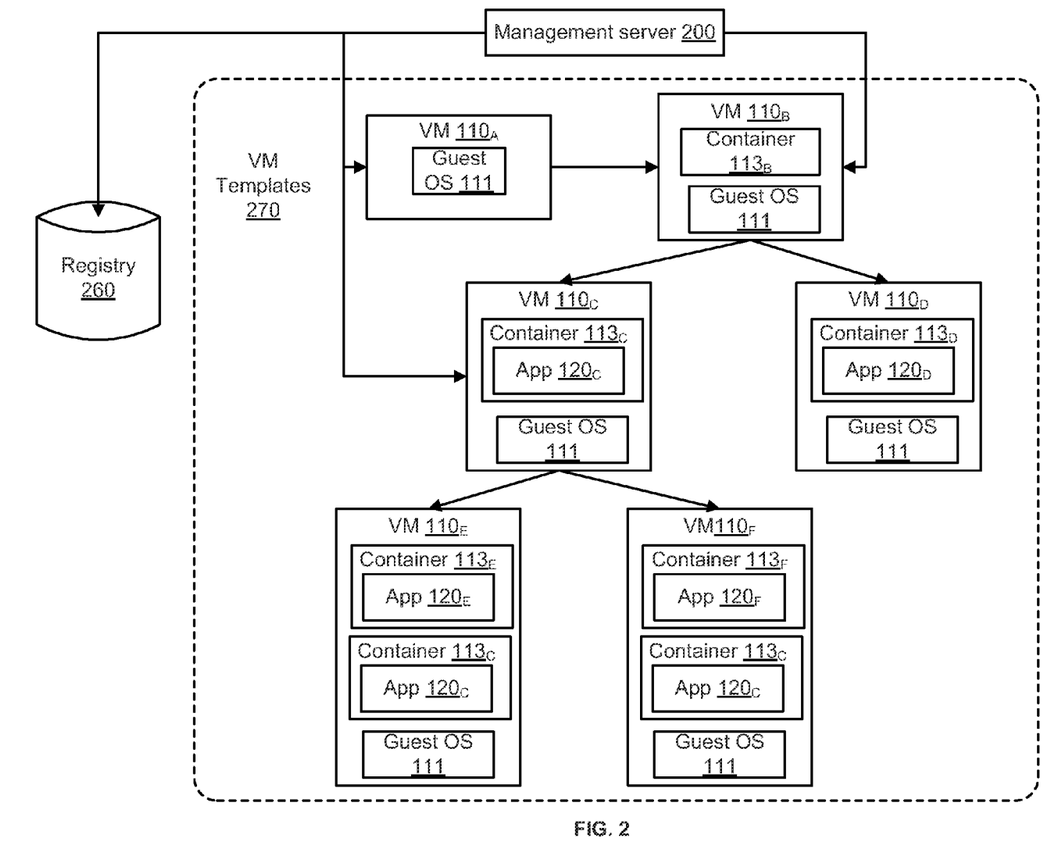
FIG. 2 is a conceptual diagram depicting the creation of a hierarchy of template VMs, each of which may be forked to create a child VM in which a containerized application executes, according to embodiments.

FIG. 2 is a conceptual diagram depicting the creation of a hierarchy of template VMs, each of which may be forked to create a child VM in which a containerized application executes. As shown, a system administrator uses management server 200 to create the hierarchy (which is referred to in the figure as VM templates 270). Management server 200 comprises management software that may execute on a desktop or server-class computer, a laptop or notebook computer, or as a smartphone application. Management server 200 creates and updates VM templates 270 over a local or wide area network, a wireless network, or via a direct connection to a host computer on which the virtual machines in VM templates 270 execute. It should be noted that the virtual machines that comprise VM templates 270 may execute on a common host computer, or may be distributed among several host computers.

As shown in FIG. 2, management server 200 coordinates the creation of VMs and the addition of the created VMs to VM templates 270. Management server 200 creates a base VM (depicted as VM $110_A$), which includes a guest OS 111 (similar to guest OS 111 in FIG. 1). According to embodiments, guest OS 111 is capable of executing in a virtual machine (i.e., under the control of a hypervisor) and is capable of supporting execution of application containers. When management server 200 creates VM $110_A$, management server 200 records information about VM $110_A$ in a registry 260. Registry 260 is a database that stores information pertaining to virtual machines, such as virtual machine identifiers, network addresses (e.g., media access control (MAC) addresses and Internet Protocol (IP) addresses), as well as identifiers of application containers that the virtual machines execute. In one or more embodiments, this information enables an application server (described below), in response to an application request, to locate an appropriate template VM in the hierarchy, and to create a child VM based on the template that is responsive to the needs of the application requestor.

Management server 200 instructs VM $110_A$ to perform a VM fork operation (similar to fork operation 130 in FIG. 1), in order to create VM $110_B$. immediately after the fork, VM $110_B$ includes guest OS 111 (which is shared with VM $110_A$). After creation, management server 200 instantiates a container $113_B$ in VM $110_B$, which runs under the control of guest OS 111. It should be noted that container $113_B$ does not contain any applications. Management server 200 then registers VM $110_B$ in registry 260.

Management server 200 then continues creating VM templates 270 by instructing VM $110_B$ to perform two fork operations in order to create VMs $110_C$ and $110_D$, respectively. At the time of creation, both VMs $110_C$ and $110_D$ are exact copies of VM $110_B$. That is, both VMs $110_C$ and $110_D$ have the same state as VM $110_B$, execute all of the same processes as VM $110_B$, and include a container that shares the same memory location as container $113_B$. However, as shown in FIG. 2, management server 200 installs application $120_C$ into the container of VM $110_C$. This container is referred to as container $113_C$ because container $113_C$ (after installation of application $120_C$) no longer shares the same state (including memory location) as that of container $113_B$ of VM $110_B$. Similarly, management server 200 installs application $120_D$ into the container of VM $110_D$, which is referred to as container $113_D$ in FIG. 2. After creating both VMs $110_C$ and $110_D$, management server 200 registers both VMs in registry 260.

It should be noted that VMs $110_{A-D}$ each shares (from a memory standpoint) the same guest OS 111. However, each of containers $113_{B-D}$ is stored in a different part of system RAM (such as RAM 140 in FIG. 1).

Although it is often advantageous to execute a single application container within a virtual machine, it is, at times, desirable to have more than one application container execute in a virtual machine. This is especially true when the applications need to communicate with each other with minimal latency. Thus, continuing with the creation of the hierarchy represented by VM templates 270, management server 200 instructs VM $110_C$ to perform fork operations to create VMs $110_E$ and $110_F$. Immediately after each of VMs $110_E$ and $110_F$ is created, these VMs are exact copies of VM $110_C$. Thus, each of these VMs includes guest OS 111 and container $113_C$, with application $120_C$ executing therein. However, as shown in the figure, management server 200 proceeds to instantiate container $113_E$ on VM $110_E$ and container $113_F$ on VM $110_F$. Moreover, management server 200 installs application $120_E$ in container $113_E$ and application $120_F$ in container $113_F$. Management server 200 also registers both VMs $110_E$ and $110_F$ in registry 260.

It should be noted that container $113_C$ in VM $110_E$ and container $113_C$ in VM $110_F$ are identical in terms of memory state at the time each of these VMs is created as a result of the forking of VM $110_C$. However, VMs $110_E$ and $110_F$ are independent virtual machines. This means that, should either virtual machine execute application $120_C$, then the respective containers would cease to be exact replicas of container $113_C$ of parent VM $110_C$. This results in unintended memory usage, as additional memory would be required by each of the independently executing application containers of VMs $110_E$ and $110_F$. Indeed, this holds true for any of the applications, containers, and guest OS of any child VM. Thus, in order to avoid containers, applications, and any operating system software in a child VM from changing from any corresponding software in a parent VM, management server 200 stalls the execution each of the virtual machines in VM templates 270, once that virtual machine has been created by a forking operation, and once a container (or application) has been installed on the virtual machine. Thus, referring to FIG. 2, once management server 200 completes creating each of VMs $110_{A-F}$, and completes instantiating on child VMs new containers and installing applications into those newly instantiated containers, management server 200 stalls execution of each of the VMs in VM templates 270 to ensure that the underlying state (including the memory state) of each VM is preserved.

Therefore, once management server 200 finishes creating VMs in VM templates 270, each of VMs $110_C$, $110_E$, and $110_F$ has a "warmed up" application container $113_C$ (i.e., an application container that, upon being deployed in a forked virtual machine, is immediately executable). Further, VM $110_D$ has a warmed up application container $113_D$, VM $110_E$ has a warmed up application container $113_E$, and VM $110_F$ has a warmed up application container $113_F$. Further, each of VMs $110_C$, $110_E$, and $110_F$ is registered as having executing therein the aforementioned containers as illustrated in FIG. 2.

Figure 3:
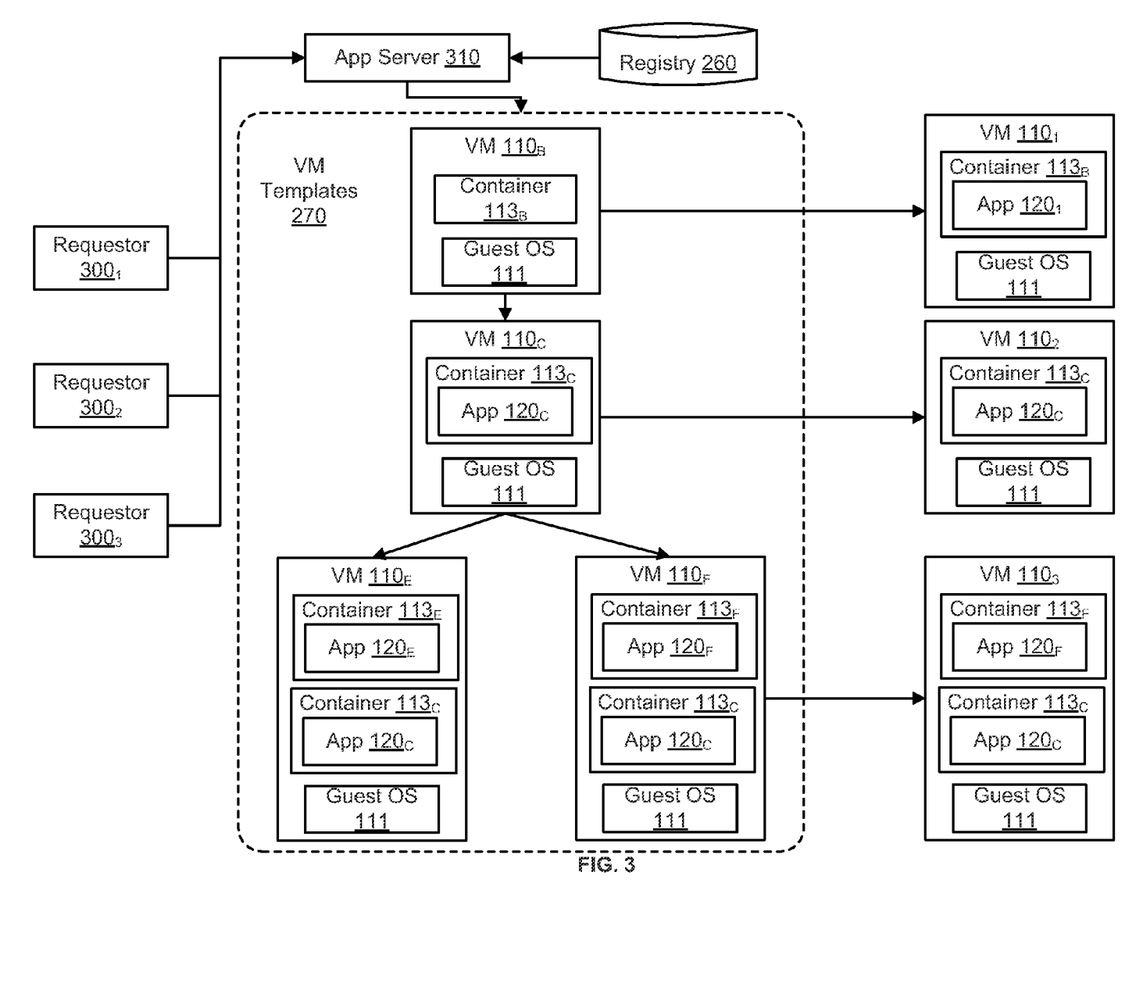
FIG. 3 is a conceptual diagram depicting the receipt of application requests by an application server and, in response, creation of child VMs by forking corresponding parent VMs, according to embodiments.

FIG. 3 is a conceptual diagram depicting an application server receiving application requests and, in response, creating child VMs by forking corresponding parent VMs, according to one or more embodiments. VM templates 270 are based on the hierarchy created by management server 200, which is illustrated in FIG. 2.

As shown in the figure, three application requestors (requestors $300_{1-3}$) generate application requests and transmit those requests to application server 310. Requestors $300_{1-3}$ may be client processes that require performance of discrete transactions by a remote application (such as, for example, a database query). In such a case, requestors $300_{1-3}$ transmit requests to application server 310. Application server 310 creates one or more virtual machines (by instructing a template virtual machine to perform a fork operation). The forked virtual machines execute to service the request, and application server returns results (either synchronously or asynchronously) to the requestor 300 whose request has been serviced.

In other cases, requestors $300_{1-3}$ may require continuing access to a newly created containerized application. In such cases, application server 310 instructs a template virtual machine to perform a fork operation, and then, after the virtual machine is forked, application server 310 returns a handle to the forked virtual machine to the requestor 300. This enables the requestor 300 to interact with the forked virtual machine on a continuing basis.

In still other cases, any of requestors $300_{1-3}$ may have an application that requires execution in an application container. In such a case, the requestor 300 invokes application server 310 and passes a copy of the application or a pointer to the application to application server 310, or, alternatively, specifies the name of the application as a parameter that is passed to application server 310. In such a case, application server 310 forks a containerized VM template that executes in VM templates 270. Application server 310 then installs the application passed from the requestor 300 into a container executing within the forked VM and launches the application. Other patterns for invoking application server 310 are possible and within the scope of the present disclosure.

For example, referring to FIG. 3, requestor $300_1$ transmits an application request to application server 310. The request of requestor $300_1$ includes an application that requestor $300_1$ requires to be executed in a container in a virtual machine. In response to receiving the request from requestor $300_1$, application server 310 performs a lookup function in registry 260 in order to locate a VM template that includes a container into which the application may be installed (i.e., an "empty" container). Application server 310 locates VM $110_B$, because VM $110_B$ includes empty container $113_B$. Application server 310 then instructs VM $110_B$ to perform a fork operation, which creates VM $110_1$. Upon creation of VM $110_1$, the VM includes guest OS 111 and container $113_B$. Application server 310 then installs application $120_1$ (which is the application that requestor $300_1$ passes to application server 310) into container $113_B$ of VM $110_1$. Once application $120_1$ is installed in container $113_B$, in one or more embodiments, application $120_1$ is launched. In addition, according to embodiments, application server 310 transmits a handle to VM 110 back to requestor $300_1$, which enables requestor $300_1$ to interact with VM $110_1$.

Still referring to FIG. 3, requestor $300_3$ transmits a second application request to application server 310. The request transmitted by requestor $300_3$ does not include a copy of (or a pointer to) an application. Rather the request transmitted by requestor $300_3$ indicates application $120_C$, and, optionally, includes parameters to be passed to that application. In response to receiving the request from requestor $300_3$, application server 310 locates (in registry 260) VM $110_C$ as a template virtual machine that executes a container that includes application $120_C$. Therefore, application server 310 instructs VM $110_C$ to perform a fork operation. This results in the creation of VM $110_2$, which, as shown, includes container $113_C$, which, itself, contains application $120_C$. After creation of VM $110_2$, containerized application $120_C$ is launched, parameters (if required) are passed to application $120_C$, and results from application $120_C$ are returned to requestor $300_3$. In other embodiments, once VM $110_2$ is created by the fork operation, application server 310 returns a handle to the forked VM to requestor $300_3$.

Still referring to FIG. 3, requestor $300_3$ transmits a third application request to application server 310. The request transmitted by requestor $300_3$ indicates that requestor $300_3$ requires access to two applications (namely, applications $120_C$ and $120_F$), each of which executes in a separate container. In response to the request from requestor $300_3$, application server 310 locates VM $110_F$ in registry 260 because VM $110_F$ includes containers $113_C$ and $113_F$, each of which includes, respectively, application $120_C$ and $120_F$. Application server 310 then instructs VM $110_F$ to perform a fork operation to create VM $110_3$. As shown, VM $110_3$ includes container $113_C$ (which executes application $120_C$) and container $113_F$ (which executes application $120_F$). After creation of VM $110_3$, application server 310 launches containerized applications $120_C$ and $120_F$, passes parameters (if required) to the applications, and returns any results generated by the launched applications to requestor $300_3$. In other embodiments, once VM $110_3$ is created by the fork operation, application server 310 returns a handle to the forked VM to requestor $300_3$, which enables requestor $300_3$ to communicate with containerized applications $120_C$ and $120_F$ on an ongoing basis.

It bears mentioning that, when each of VMs $110_{1-3}$ is created by a corresponding fork operation, each of the VMs is an exact replica (i.e., has identical state) as its parent VM (i.e., VM $110_B$, $110_C$, and $110_F$, respectively). However, after applications are installed or launched in each of the forked VMs, the states of the child and parent VMs become different and each child VM executes independent of the corresponding parent VM.

Figure 4:
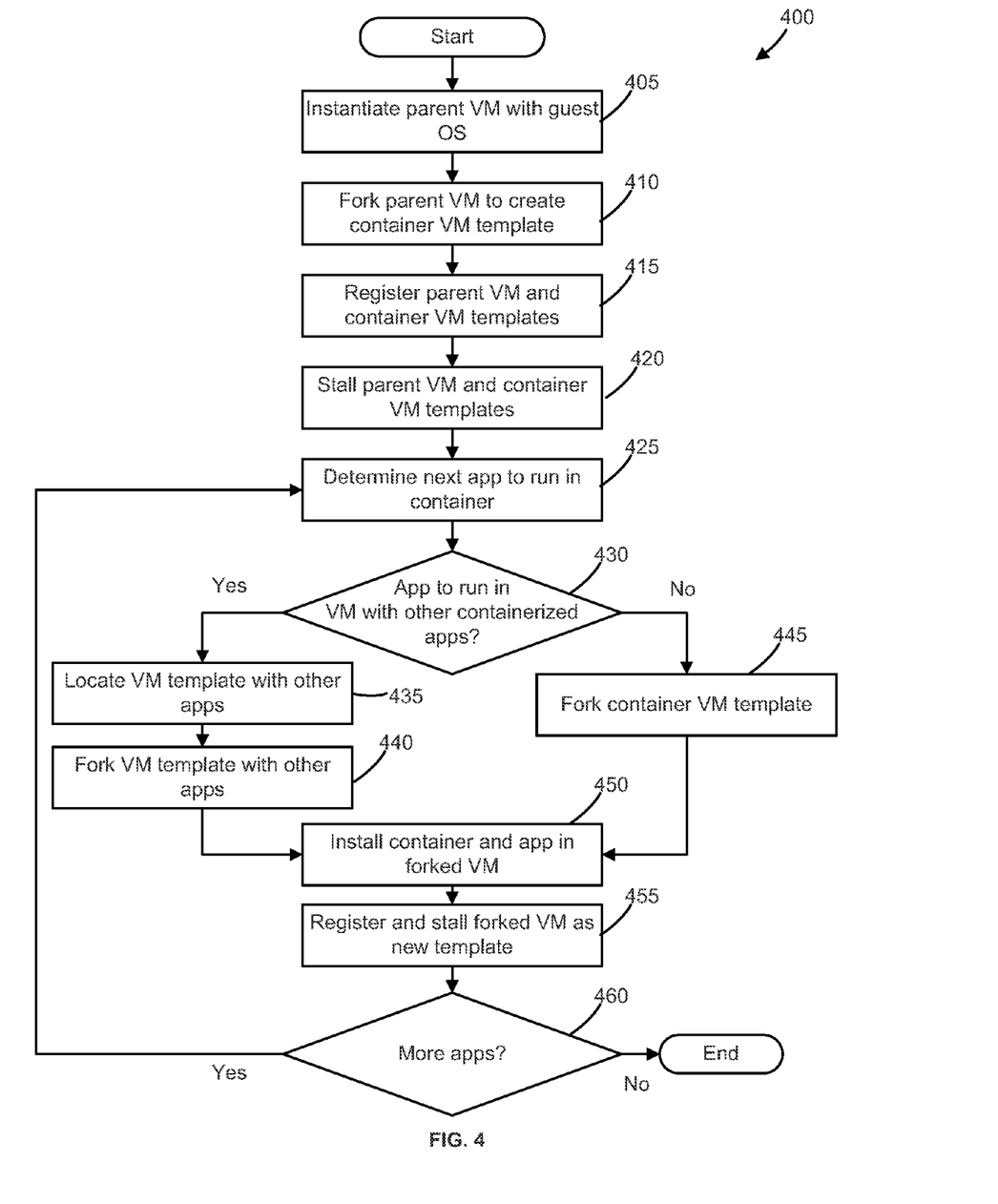
FIG. 4 is a flow diagram that depicts a method for creating a hierarchy of VM templates, where each VM template may be forked to create a child VM configured to execute one or more containerized applications, according to embodiments.

FIG. 4 is a flow diagram that depicts a method 400 for creating a hierarchy of VM templates, where each VM template may be forked to create a child VM configured to execute one or more containerized applications. Method 400 is performed by management software executed in response to requests from a system administrator. An example of such an administrative software platform is shown in FIG. 2 as management server 200.

Method 400 begins at step 405, where management server 200 instantiates a parent VM on a host computer. The parent VM includes a guest OS, where the guest OS is capable of executing one or more application containers. An example of such a parent VM is VM $110_A$, depicted in FIG. 2.

Once the parent VM is instantiated, method 400 proceeds to step 410. At step 410, management server 200 instructs the parent VM to perform a forking operation to create a child VM, where, after forking, management server 200 starts a container daemon on the child VM and instantiates an empty application container on the child VM. The child VM created at step 410 is referred to as a container VM template. An example of a container VM template is VM $110_B$, depicted in FIG. 2.

After the parent VM and container VM template are created at steps 405 and 410, management server 200 registers both the parent VM and container VM template at step 415. As previously mentioned, the registering of template VMs in a hierarchy (such as VM templates 270, depicted in FIG. 2) enables, for example, an application server to locate a VM in that hierarchy in order to appropriately service application requests. Registration of the parent VM and the container VM template is accomplished, in embodiments, by updating a centralized registry, such as registry 260 shown in FIG. 2. According to embodiments, management server 200 stores, for each registered VM, a virtual machine identifier, a network address, and one or more application identifiers that correspond to applications that execute in the registered VM.

At step 420, management server 200 stalls execution in both the parent VM and container VM template. The stalling step is performed to prevent updates to the state (including the memory state) of each of these VMs. As mentioned above, VM templates that are instantiated in a hierarchy through a forking process share one or more segments of RAM. This memory-sharing scheme provides for consistency among VMs in the hierarchy and conserves scarce memory resources. According to one or more embodiments, the stalling is performed by preventing any VM template from executing instructions that would modify any of its shared memory segments.

At step 425, the administrative software (i.e., management server 200) performing method 400 determines a next application that is to be executed in a container. According to one or more embodiments, management server 200 maintains a list of applications that are required by one or more end users to run in an application container. It is advantageous to run some of these applications in a single-container virtual machine, while it may be advantageous to execute other applications in a multi-container virtual machine.

Accordingly, once management server 200 determines the next application to be run in a container, method 400 proceeds to step 430. At step 430, management server 200 determines whether the next application is to run in a VM with any other containerized applications.

If the next application is to be run in the same VM with other containerized applications, then method 400 proceeds to step 435. At step 435, management server 200 locates a VM template in the hierarchy that contains the applications with which the current application is to execute. Management server 200 locates an appropriate VM template by performing a lookup to the registry (i.e., registry 260). After locating a VM template that has the required containerized applications, method 400 proceeds to step 440, where management server 200 instructs the located VM template to perform a fork operation, thereby creating a replica of the VM template in the hierarchy. As previously mentioned, at the time that the replica of the VM template is created, the VM replica executes with identical state as the parent VM template, and execution of the VM replica begins at the instruction immediately following the fork operation executed by the parent VM template.

Referring back to step 430, if management server 200 determines that the next application is to run in a container "standalone" in a virtual machine, then method 400 proceeds to step 445. At step 445, management server 200 instructs the container VM template (e.g., VM $110_B$ in FIG. 2), which has a single empty container, to perform a fork operation, thereby creating a replica of the container VM template in the hierarchy, where the state of the VM replica is identical, at the time of the fork, as the state of the parent VM template.

Next, at step 450, management server 200 instantiates a new container (if needed) on the forked VM and installs the application in the container. It should be noted that a new container would need to be instantiated in the case of a multi-container VM. However, if the application is to run in a single-container VM, then the application is installed in the empty container that is copied (due to the fork operation) from the container VM template. Further, once an application is installed in the empty container, that container with the application installed therein occupies a segment of RAM that is different from the segment occupied by the empty container. This is shown in FIG. 1 by containers $113_1$ and $113_2$. It should be noted that, due to COW semantics, once an application is installed in a container, the virtual memory of the forked VM is remapped so that the physical memory pages allocated to the application container are no longer the same as the physical memory pages allocated to the "empty" container of the parent VM template.

Once the application is installed to the container in the forked VM, management server 200 then registers and stalls the execution of the forked VM as a new VM template at step 455. The registration of the forked VM specifies, in embodiments, an identifier and network address for the new VM template, as well as an inventory of all application containers installed therein. The stalling of the execution of the new VM template ensures that its state is preserved.

Once step 455 is complete, the hierarchy (e.g. VM templates 270 shown in FIG. 2) includes a new VM template with one or more "warmed up" containerized applications ready for rapid deployment. Management server 200 then determines, at step 460, whether there are more applications that are required to be run in a container. If there are more applications that require execution in a container, then method 400 proceeds back to step 425, where management server 200 determines a next application. Management server 200 then performs steps 430-455 as set forth above. However, if management server 200 determines that there are no more applications that require execution in a container, then method 400 terminates.

Figure 5:
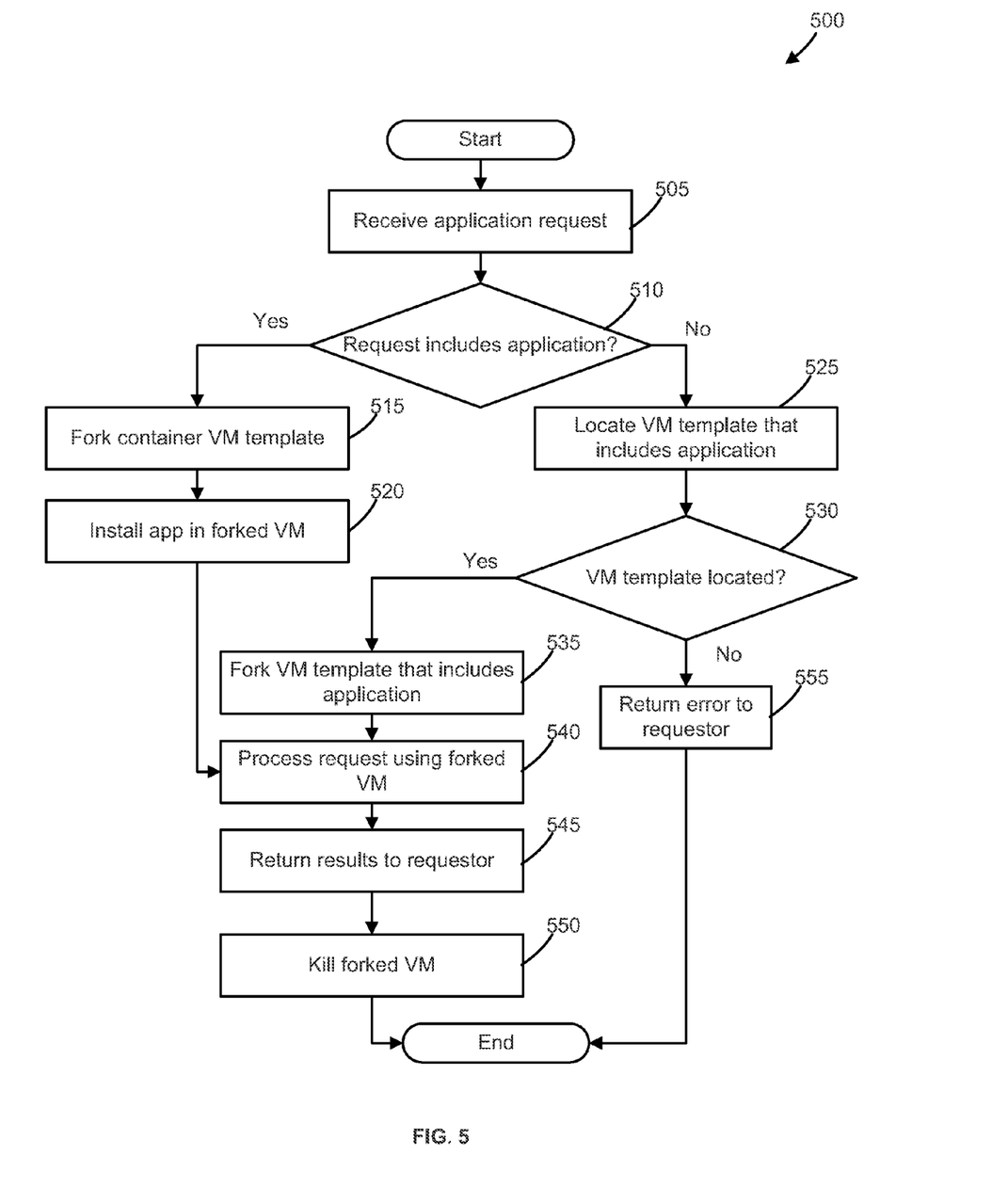
FIG. 5 is a flow diagram that depicts a method for deploying one or more containerized applications, according to embodiments.

FIG. 5 is a flow diagram that depicts a method 500 for deploying one or more containerized applications, according to embodiments. Method 500 is performed by an application server, such as application server 310 depicted in FIG. 3.

Method 500 begins at step 505, where application server 310 receives an application request. Application requests include, for example, an identifier for an application, one or more parameters for the application, as well as an address where results from execution of the application are to be returned. In addition, the application request may include a copy of (or a pointer to) an application that a requestor requires to be executed in a container.

Thus, at step 510, application server 310 determines whether the request includes the application to be executed. If the request does include a copy of or pointer to the application to be executed, then method 500 proceeds to step 515. At step 515, application server 310 forks a container VM template (or, alternatively, instructs a container VM template to execute a fork operation), such as the container VM template described in connection with method 400 in FIG. 4. As previously mentioned, such a container VM template is a virtual machine template that executes a single empty container. After executing the fork operation, a forked VM template is created, where the forked VM template has identical state as the parent VM template. Further, once created, the forked VM template is a fully initialized and executing virtual machine that begins execution at the instruction immediately following the fork operation executed by the parent VM template. Once application server 310 forks the container VM template, method 500 proceeds to step 520.

At step 520, application server 310 installs the application provided with the application request into the container of the forked VM template created at step 515. As previously mentioned, as a result of COW, installation of the application at step 520 causes the virtual memory of the forked VM template corresponding to the container to be remapped so that the container of the forked VM template no longer overlaps in physical memory with the container of the parent VM template. Thus, after step 520, a VM is instantiated with a warmed up application, where the application is the one provided in the request received at step 505. Method 500 then proceeds to step 540.

However, referring back to step 510, if the received request does not include a copy of the application (or pointer to the application), then method 500 proceeds to step 525. At step 525, application server 310 locates a VM template in the hierarchy that includes the application specified in the received request. According to embodiments, the request may specify a particular application with a unique application identifier. In response, application server 310 performs a lookup in a centralized registry (such as registry 260 in FIG. 2) to locate a VM template that includes a container that executes the specified application.

Application server determines, at step 530, whether such a VM template has been located. If application server 310 does not locate an appropriate VM template, then method 500 proceeds to step 555, where an error is returned to the application requester. Method 500 then terminates.

However, if application server is able to locate an appropriate VM template, then method 500 proceeds to step 535. At step 535, application server 310 forks the located VM template to produce a child VM that includes the containerized application that was specified in the request. Then, at step 540, the forked VM is launched to process the received request. It should be noted that step 540 is reached from step 520 (when the request includes the application to be run) and from step 535 (when the request does not include the application to be run). Processing of the request at 540 entails, in embodiments, the launching of the forked VM, the invoking of one or more containerized applications in the forked VM, and the passing of parameters received in the request to the containerized applications.

After the request is processed at step 540, method 500 proceeds to step 545. At step 545, results (if any) from executing the containerized application are obtained and returned to the requestor. In other embodiments, a handle to the forked VM is returned to the requestor, which enables the requestor to conduct ongoing communication with the forked VM.

After step 545, method 500 proceeds to step 550. At step 550, application server 310 (having returned results to the requestor) determines that the forked VM is no longer needed and, in order to conserve system resources, kills all processes executing on behalf of the forked VM. However, in other embodiments, application server 310 receives an indication from a requestor that the forked VM is no longer required before proceeding to kill the forked VM.

Although one or more embodiments have been described herein in some detail for clarity of understanding, it should be recognized that certain changes and modifications may be made without departing from the spirit of the disclosure. The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, yielding, identifying, determining, or comparing. Any operations described herein that form part of one or more embodiments of the disclosure may be useful machine operations. In addition, one or more embodiments of the disclosure also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present disclosure may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present disclosure have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Many variations, modifications, additions, and improvements are possible. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method of creating a hierarchy of virtual machine templates in a virtualized computing system that supports the execution of a plurality of virtual machines, each virtual machine supporting the execution of one or more applications therein, and each application executing within a container that isolates the application executing therein from other processes executing on the virtualized computing system, the method comprising:
    instantiating a first parent virtual machine template having a guest operating system and a first container;
    determining a first application to be run in a container;
    receiving instructions to perform a fork operation on the first parent virtual machine template to create a first child virtual machine template, the first child virtual machine template including a replica of the first container, wherein the guest operating system of the first parent virtual machine template is mapped to a memory location that overlaps with a memory location of a guest operating system of the first child virtual machine template; and
    installing the first application in the replica of the first container, wherein, before installing the first application in the replica of the first container, memory locations corresponding to the first container of the first parent virtual machine template overlap with memory locations of the replica of the first container of the first child virtual machine template, and, after installing the first application in the replica of the first container, memory locations corresponding to the first container do not overlap with memory locations corresponding to the replica of the first container.

2. The method of claim 1, further comprising:
    registering the first parent virtual machine template and the first child virtual machine template in a registry, the registry containing an identifier for each of the first parent and first child virtual machine templates.

3. The method of claim 1, further comprising stalling execution of the first parent and first child virtual machine templates, wherein, after the stalling of the first parent virtual machine template, a memory state of the first parent virtual machine template is prevented from being changed, and, after the stalling of the first child virtual machine template, a memory state of the first child virtual machine template is prevented from being changed.

4. The method of claim 1, further comprising:
    instantiating a second parent virtual machine template having a guest operating system; and
    forking the second parent virtual machine template to create the first parent virtual machine template.

5. The method of claim 4, further comprising instantiating the first container on the first parent virtual machine template.

6. The method of 1, further comprising:
    determining that a second application is to run in the same virtual machine as one or more other applications;
    responsive to the determining, locating a second parent virtual machine template that includes containers that contain the one or more other applications;
    forking the second parent virtual machine template to create a second child virtual machine template;
    instantiating a second container in the second child virtual machine template; and
    installing the second application in the second container.

7. A non-transitory computer-readable medium that stores instructions that are executable by a virtualized computing system, the virtualized computing system supporting the execution of a plurality of virtual machines, each virtual machine supporting the execution of one or more applications therein, and each application executing within a container that isolates the application executing therein from other processes executing on the virtualized computing system, and where the instructions, when executed, cause the virtualized computing system to perform a method of creating a hierarchy of virtual machine templates, the method comprising:

instantiating a first parent virtual machine template having a guest operating system and a first container;

determining a first application to be run in a container;

receiving instructions to perform a fork operation on the first parent virtual machine template to create a first child virtual machine template, the first child virtual machine template including a replica of the first container, wherein the guest operating system of the first parent virtual machine template is mapped to a memory location that overlaps with a memory location of a guest operating system of the first child virtual machine template; and installing the first application in the replica of the first container, wherein, before installing the first application in the replica of the first container, memory locations corresponding to the first container of the first parent virtual machine template overlap with memory locations of the replica of the first container of the first child virtual machine template, and, after installing the first application in the replica of the first container, memory locations corresponding to the first container do not overlap with memory locations of the replica of the first container.

8. The computer-readable medium of claim 7, wherein the method further comprises:

registering the first parent virtual machine template and the first child virtual machine template in a registry, the registry containing an identifier for each of the first parent and first child virtual machine templates.

9. The computer-readable medium of claim 7, wherein the method further comprises stalling execution of the first parent and first child virtual machine templates, wherein, after the stalling of the first parent virtual machine template, a memory state of the first parent virtual machine template is prevented from being changed, and, after the stalling of the first child virtual machine template, a memory state of the first child virtual machine template is prevented from being changed.

10. The computer-readable medium of claim 7, wherein the method further comprises:

instantiating a second parent virtual machine template having a guest operating system; and forking the second parent virtual machine template to create the first parent virtual machine template.

11. The computer-readable medium of claim 10, wherein the method further comprises instantiating the first container on the first parent virtual machine template.

12. The computer-readable medium of claim 7, wherein the method further comprises:

determining that a second application is to run in the same virtual machine as one or more other applications;

responsive to the determining, locating a second parent virtual machine template having containers that contain the one or more other applications;

forking the second parent virtual machine template to create a second child virtual machine template;

instantiating a second container in the second child virtual machine template; and installing the second application in the second container.

13. In a virtualized computing system that supports the execution of a plurality of virtual machines, each virtual machine supporting the execution of one or more applications therein, and each application executing within a container that isolates the application executing therein from other processes executing on the virtualized computing system, a method of deploying containerized applications for execution within virtual machines, the method comprising:

receiving from a requestor a request to execute an application;

locating a first virtual machine template having a container configured to execute the application;

receiving instructions to perform a fork operation on the first virtual machine template to create a first child virtual machine that includes a replica of the container, wherein the guest operating system of the first virtual machine template is mapped to a memory location that overlaps with a memory location of a guest operating system of the first child virtual machine template; and launching the application to execute within the first child virtual machine, wherein, before launching the application to execute within the first child virtual machine, memory locations corresponding to the container of the first virtual machine template overlap with memory locations of the replica of the container of the first child virtual machine template, and, after launching the application to execute within the first child virtual machine, memory locations corresponding to the container do not overlap with memory locations corresponding to the replica of the container.

14. The method of claim 13, further comprising:

determining that the request includes a copy of the application to be run; and responsive to the determining, locating a second virtual machine template having an empty container.

15. The method of claim 14, further comprising:

forking the second virtual machine template to create a second child virtual machine that includes a replica of the empty container;

installing the copy of the application in the empty container; and launching the application to execute within the second child virtual machine.

16. The method of claim 13, further comprising:

receiving results from the first application; and transmitting the results to the requestor.

17. The method of claim 13, further comprising:

receiving a handle to the first child virtual machine; and transmitting the handle to the first child virtual machine, wherein the requestor communicates with the first child virtual machine using the handle.

18. The method of claim 16, further comprising:

determining that the first child virtual machine is no longer required to be executing; and responsive to the determining, killing the first child virtual machine.

\* \* \* \* \*